April 29, 1924.
P. G. LEONARD
FISHING TOOL
Filed May 14, 1923
1,492,473
3 Sheets-Sheet 1
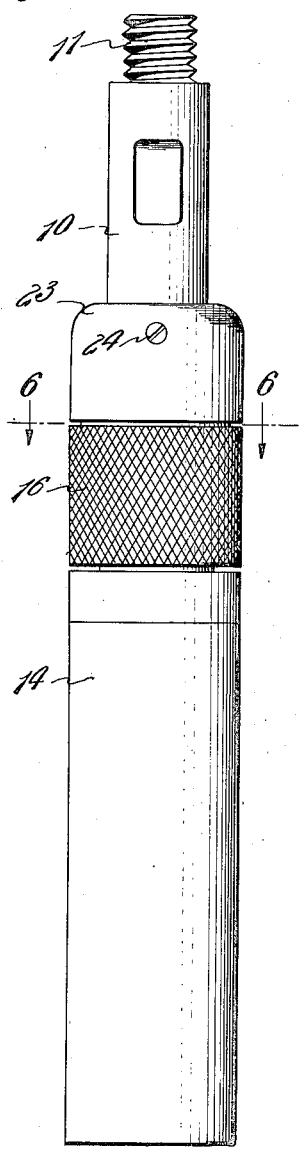
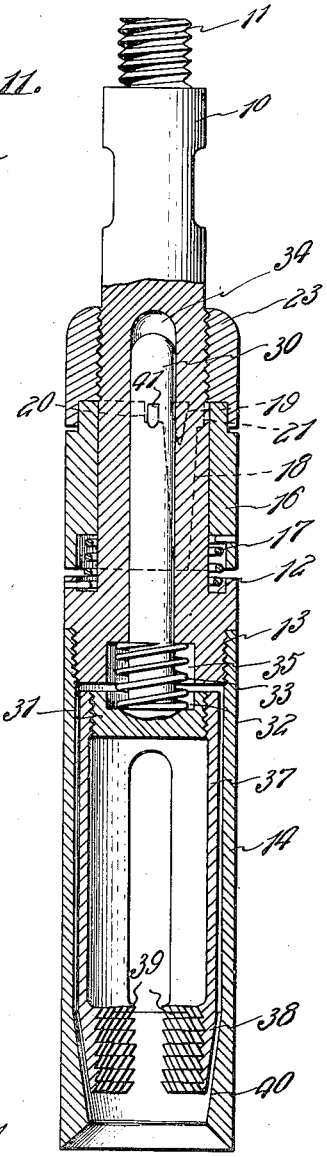
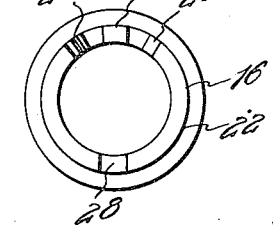
P. G. Leonard
INVENTOR
BY *Victor J. Evans*
ATTORNEY
WITNESS:

April 29, 1924.
P. G. LEONARD
FISHING TOOL
Filed May 14, 1923
1,492,473
3 Sheets-Sheet 2
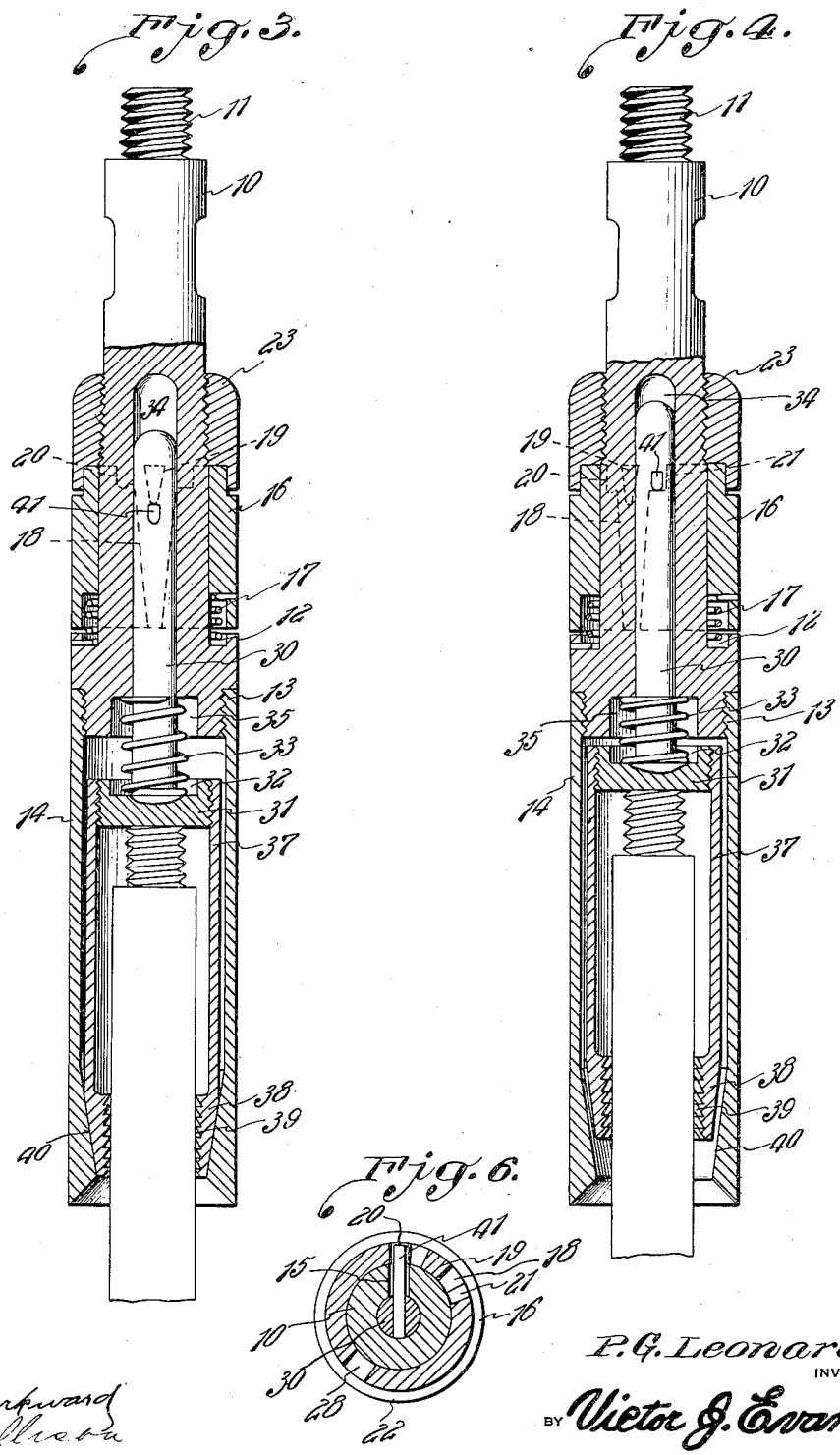

April 29, 1924.

P. G. LEONARD

FISHING TOOL

Filed May 14, 1923 3 Sheets-Sheet 3

1,492,473

P. G. Leonard
INVENTOR
BY Victor J. Evans
ATTORNEY

WITNESS:

Patented Apr. 29, 1924.

1,492,473

UNITED STATES PATENT OFFICE.

PETER G. LEONARD, OF WEST TULSA, OKLAHOMA.

FISHING TOOL.

Application filed May 14, 1923. Serial No. 638,934.

*To all whom it may concern:*

Be it known that I, PETER G. LEONARD, a subject of the King of Sweden, residing at West Tulsa, in the county of Tulsa and State of Oklahoma, have invented new and useful Improvements in Fishing Tools, of which the following is a specification.

This invention contemplates the provision of a fishing tool for removing broken tools or rods from a well and has for its chief characteristic the provision of a device embodying an automatic gripping, releasing and regripping mechanism, in combination with means to prevent the release of the gripping mechanism under certain conditions.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view in elevation of the tool constructed in accordance with the invention.

Figure 2 is a vertical sectional view therethrough showing the normal position of the parts.

Figure 3 is a similar view showing the position of the parts when the object to be removed is initially gripped.

Figure 4 is a view showing the position of the parts subsequent to the release and regripping of the object to be removed by the tool.

Figure 6 is a transverse sectional view taken on the line 6—6 of Figure 1.

Figure 9 is a top plan view of the rotating sleeve.

Figure 11 is a perspective view of the pin 25.

Figure 5:
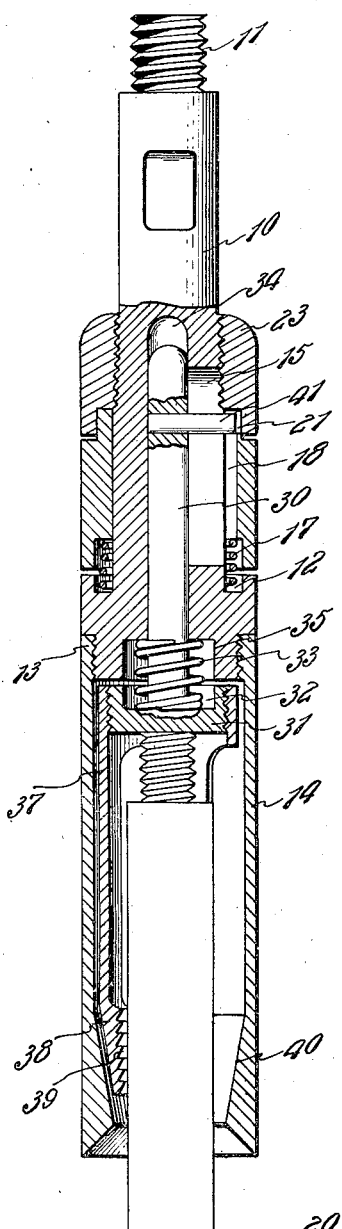
Figure 5 is a sectional view taken at a right angle to Figure 4.
Figure 7:
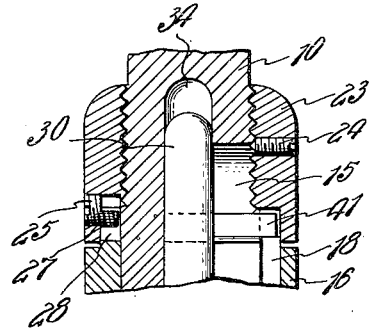
Figure 7 is an enlarged fragmentary view showing the manner of preventing the gripping means from being released under certain conditions.
Figure 10:
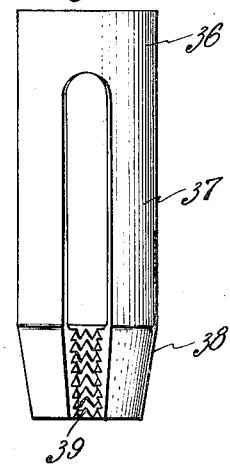
Figure 10 is a detail view of the gripping device.
Figure 8:
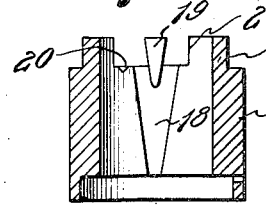
Figure 8 is a detail view partly in section of the rotating sleeve.

Referring to the drawings in detail 10 indicates the body of the tool which may be of any suitable size, and threaded as at 11 to accommodate itself to the usual rod or cable "not shown" employed to lower the tool into the well. The body portion 10 is formed at an appropriate point in its length with opposed shoulders 12 and 13 respectively, the barrel 14 which is threaded on the lower end of this body portion bearing against the adjacent shoulder 13. The body portion is further provided with a longitudinal slot 15 for a purpose to be hereinafter described, while mounted on the body portion for rotation thereon, and surrounding this slot is a sleeve 16. This sleeve is arranged immediately above the shoulder 12 and reposing upon this shoulder is a coiled spring 17 having one end secured to the body portion and the other end secured to the sleeve, the spring being tensioned to turn or tends to turn the sleeve in one direction on the body portion. The sleeve is provided with a tapered groove 18 formed on the inner periphery of the sleeve, and adjacent the upper end of this groove, I provide a rib 19 arranged in the longitudinal center of the groove. The sleeve at both sides of the rib is formed with notches 20 and 21 respectively, the purpose of which is to be hereinafter more fully described. The sleeve is reduced at its upper end as at 22, and this reduced portion is received by a collar 23 which is threaded on to the body portion 10 and is held fixed thereto by means of a set screw 24. This collar 23 supports a pin 25, one side of which is substantially flat as at 26 and the other side rounded or curved as at 27, this pin being disposed to operate with a notch 28 formed on the upper and reduced end portion of the said sleeve for a purpose to be presently set forth.

The gripping device includes a rod 30 and a disk like portion 31 supported by the lower end of the rod and recessed as at 32 to accommodate one end of a coiled spring 33 which surrounds the rod 30. The gripping device is positioned in the barrel or shell 14, with the rod 30 received by the bore 34 of said body portion and the upper end of the spring is positioned within the recess 35 arranged at the end of the body portion and communicating with said bore. Threaded on the disk like portion 31 is an annulus 36, and depending from this annulus is a plurality of spaced gripping elements 37, each having its lower end enlarged and tapered inwardly as at 38, and which portions are further serrated as at 39 to obtain an effective purchase upon the object to be removed from the well. It will be noted that the lower end of the barrel 14 has its inner surface bevelled as at 40 to correspond with the bevel surface 38 of the corresponding elements, so that when the gripping elements move downward in the barrel they are moved into gripping relation with each other for the purpose specified. Projecting at a right angle from this gripping device is a pin 41 which operates in the slot 15 formed in the body portion, and in the normal position of the parts is received by the notch 20 of the sleeve. This holds the gripping device elevated within the barrel 14, with the gripping elements 37 separated or inactive.

In practice, when it is desired to fish a broken tool or rod from the well, the device above described is lowered into the well until the object to be removed strikes the disk like portion 31 moving the latter together with the rod 30 upwardly against the tension of the spring 33. Incident to this movement of the rod 30, the pin 41 is moved out of the notch 20, thereby releasing the sleeve 16 so that the latter is turned under the influence of the spring 17 in one direction, or in other words toward the left. It is of course to be understood that this sleeve forms the main part of the automatic means for effecting the release and a subsequent operation of the gripping members 37, in that it, to a marked degree controls the vertical movements of the gripping device in its entirety. Now, after the pin has been released from the notch 20, the spring 33 functions to lower the gripping device, whereupon the gripping elements or members 37 are moved into gripping relation. The sleeve 16 however is limited in its movements toward the left by means of the rib 19 which is brought into contact with the pin 41, during the downward movement of the gripping device and rod 30 under the influence of the spring just mentioned. However, during the continued downward movement of this gripping device, the pin 41 is moved beyond the lower edge of rib 19, whereupon the sleeve 16 is again rotated in the same direction until it is stopped by the pin 41 contacting one wall of the tapered groove 18 formed in this sleeve The gripping elements 37 are now in effective engagement with the object to be removed from the well, it of course can be accomplished by elevating the device in the usual well known manner.

It sometimes happens that during the extraction of a tool or broken rod difficulty is encountered by the parts becoming stuck so that they cannot be further elevated, and it is necessary to separate the fishing tool from the object being dealt with. I therefore provide a construction whereby the tool can be automatically released under such conditions, and the object is accomplished by simply lowering the tool until the weight of the device forces the rod 30 upwardly in the bore 34. During this upward movement of the gripping device including the rod 30, the pin 41 is guided by the tapered wall of the groove 18, against which wall the pin had been contacting. The pin is thus guided into the notch 21, and when received by this notch, the gripping device is held elevated, within the barrel 14, in its normal position, and of course with the gripping elements 37 inactive. The tool in its entirety can then be conveniently lifted out of the well, and the necessary steps followed to render further use of the tool possible. Of course before the tool is again lowered into the well it is reset by reversing the rotation of the sleeve 16, incidentally winding or tensioning the spring 17, the spring being held in this condition when the pin 41 is seated within the notch 20.

Again, it is sometimes desirable to use a tool without resorting to the automatic releasing means above described, and to remove the rod or object from the well with the first grip obtained upon the object. When using the tool in this way, it is also desirable to obviate any possibility of the tool being released casually from the object which it grips and to accomplish this result it is necessary to prevent the sleeve 46 from turning. When the tool is being used in the manner herein above described, the flat side 26 of the pin 25 reposes upon the upper edge of the sleeve 16, and of course does not interfere with the rotation thereof. But when it is desired to prevent rotation of this sleeve for the purpose just referred to, this pin 25 carried by the coupling 23 is rotated, or turned, to position the rounded portion or surface 27 of the pin in the notch 28 of the sleeve, which as shown in the drawings, is arranged diametrically opposite the rib 19, and hold the sleeve in a position so that the pin 41 carried by the rod 30 cannot at any time enter either the notch 20 or 21 of the sleeve. So with the pin 25 arranged in the notch 28, the tool cannot be released from the object which it grips, and therefore there is no possibility of an accident taking place during the removal of the object from the well.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A tool of the character described comprising a body portion, having a barrel at one end, a spring pressed gripping device slidable in the barrel, a pin projecting from said gripping device, a sleeve mounted on the body portion for rotation, yieldable means connected with the sleeve for rotating the latter in one direction, and said sleeve being designed to cooperate with said pin on the gripping device, whereby the latter is automatically actuated, released and then reactuated for the purpose specified incident to the rotation of said sleeve.

2. A tool of the character described comprising a body portion having a barrel at one end, a spring pressed gripping device slidable in the barrel and including a rod movable in the body portion, said body portion having a slot a pin carried by the rod and movable in the slot, a sleeve mounted for rotation upon the body portion, a spring for rotating said sleeve in one direction, said sleeve being designed to cooperate with said pin whereby said sleeve is intermittently rotated incident to the movement of the gripping device, and means carried by the sleeve and cooperating with the pin whereby the gripping device is automatically actuated, released and then reactuated for the purpose specified.

3. A tool of the class described comprising a body portion having a barrel at one end, a gripping device slidable in the barrel, said body portion having a slot, a pin carried by the gripping device and movable in said slot, a sleeve mounted upon the body portion for rotation and arranged whereby the pin normally reposes upon the sleeve to hold the gripping device elevated, resilient means for rotating the sleeve in one direction, means carried by the sleeve and cooperating with said pin, whereby the sleeve is intermittently rotated in the same direction, thereby allowing the gripping device to be automatically actuated and automatically released, and means cooperating with said sleeve to prevent rotation of the latter whereby the gripping device may be actuated and prevented from being subsequently released automatically.

In testimony whereof I affix my signature.

PETER G. LEONARD.